United States Patent [19]

Herbrechtsmeier et al.

[11] Patent Number: 4,984,870

[45] Date of Patent: Jan. 15, 1991

[54] OPTICAL WAVEGUIDE

[75] Inventors: Peter Herbrechtsmeier, Königstein/Taunus; Gerhard Wieners, Frankfurt am Main; Jürgen Kuhls, Burghausen; Manfred Tschacher, Emmerting; Herbert Fitz, Burgkirchen, all of Fed. Rep. of Germany

[73] Assignee: Hoechst Aktiengesellschaft, Frankfurt am Main, Fed. Rep. of Germany

[21] Appl. No.: 344,236

[22] Filed: Apr. 26, 1989

[30] Foreign Application Priority Data

Apr. 28, 1988 [DE] Fed. Rep. of Germany ....... 3814299

[51] Int. Cl.$^5$ ................................................. G02B 6/00
[52] U.S. Cl. .................................................. 350/96.34
[58] Field of Search ........................... 350/96.34, 96.29

[56] References Cited

U.S. PATENT DOCUMENTS 3,993,834 11/1976 Chimura et al. .................. 428/373

FOREIGN PATENT DOCUMENTS 97325 1/1984 European Pat. Off. .
154339 9/1985 European Pat. Off. .

Primary Examiner—William L. Sikes
Assistant Examiner—Robert E. Wise

[57] ABSTRACT

An optical waveguide having a core/sheath structure whose sheath comprises a polymer which is based on vinylidene fluoride and at least one other vinyl monomer containing fluorine and has been modified and crosslinked with a trisalkoxyvinylsilane, is suitable for transmission paths of ca. 10 to 100 m and can also be used at a temperature above 100° C. without any significant reduction in the transmission path.

8 Claims, No Drawings

OPTICAL WAVEGUIDE

DESCRIPTION

The invention relates to optical waveguides (OWG) which are suitable for the transmission of light, for example of light signals for data transmission.

The optical waveguides comprise a core and a sheath, both of which comprise (different) transparent materials, the core material always having a refractive index at least one percent higher than the sheath material. The optical waveguide is generally filamentary and has a circular cross-section. A sheath material having an annular cross-section is applied as a thin layer to the filamentary core.

The materials most frequently used until now for optical waveguides are homopolymers and copolymers of methacrylates for the core and homopolymers and copolymers of methacrylates of alcohols containing fluorine or copolymers of vinylidene fluoride with other monomers containing fluorine, for the sheath.

It is known that fluorine-containing polymers which essentially comprise vinylidene fluoride (VdF), tetrafluoroethylene (TFE) and/or hexafluoropropene (HFP) have been used as sheath materials for optical waveguides which contain homopolymers and copolymers made from methyl methacrylate (MMA), styrene and esters of methacrylic acid with aliphatic alcohols as the core material (EP-A 154,339, EP-A 97,325, DE-A 2,455,265). The sheath materials containing fluorine have a tendency to become cloudy due to crystallization of the VdF and TFE components. Moreover, polymers of this type, particularly those with high proportions of HFP, can be tacky and thus unsuitable as OWG sheath material or they have poor adhesion to the core material, particularly when a low proportion of VdF is selected.

Copolymers having high proportions of TFE are poorly suited to thermoplastic processing into an OWG sheath.

It is moreover known that the long term service temperature of optical waveguides can be improved if the core and/or the sheath of the optical waveguide is/are crosslinked, after production of the same, using polyfunctional vinyl compounds or aids containing glycidyl groups (EP-A 171,294), optionally under the influence of ionizing radiation. Incompletely converted vinyl compounds can however impair the properties of the optical waveguide on lengthy use, and glycidyl groups increase the water absorption capacity of the core material.

Moreover, it is known that the long term service temperature of optical waveguides whose core or sheath is formed from a suitable polymer can be increased by treatment with ionizing radiation (JP 61/035,404). However, it has long been known that polymers which contain MMA develop yellowish brown discoloration and are degraded under the influence of ionizing radiation. The transparency of the core material is thereby impaired and the mechanical properties of the optical waveguide deteriorate.

It is also known that tubes made from fluorine-containing polymers which contain VdF, TFE and HFP and which are filled with a clear transparent fluid, can be used as optical waveguides (EP-A 246,552).

Finally, it is known that polymers which contain VdF can be crosslinked after thermoplastic processing by reaction of the polymer with the compound dimethylmethoxyvinylsilane and under the action of water (DE-A 3,327,596).

The object was to provide a highly transparent polymer material made from easily accessible monomers for producing the sheath of optical waveguides which are suitable for transmission paths of 10 to 100 meters and which can also be used at a temperature above 100° C. without significant reduction of the transmission path.

It has now been found that this object can be achieved by an optical waveguide whose sheath comprises a transparent thermoplastic molding composition which is derived from the monomers vinylidene fluoride, tetrafluoroethylene and hexafluoropropylene.

The invention thus relates to an optical waveguide having a core/sheath structure whose core comprises a polymer with a refractive index $n(C)$ and whose sheath comprises a polymer with a refractive index $n(S)$, where $n(C)/n(S) > 1.01$, wherein the core comprises a polycarbonate or comprises a polymer which contains units which are derived from styrene, from a substituted styrene, from an acrylate, from a methacrylate or from a fluoroacrylate, and the sheath comprises a polymer which has been modified and crosslinked with 0.1 to 10% by weight of a trisalkoxyvinylsilane in the presence of 0.5 to 5% by weight of a peroxide, based in each case on the unmodified polymer, and contains units which, based in each case on the unmodified polymer, are derived from 30 to 90% by weight of vinylidene fluoride and from 70 to 10% by weight of at least one other vinyl monomer containing fluorine.

The invention further relates to a process for producing an optical waveguide having a core/sheath structure whose core comprises a polymer with a refractive index $n(C)$ and whose sheath comprises a polymer with a refractive index $n(S)$, where $n(C)/n(S) > 1.01$, by extruding the core and encasing the core with a sheath, wherein the core comprises a polycarbonate or comprises a polymer which contains units which are derived from styrene, from a substituted styrene, from an acrylate, from a methacrylate or from a fluoroacrylate, and the core is encased with a sheath which comprises a polymer which has been modified and crosslinked with 0.1 to 10% by weight of a trisalkoxyvinylsilane in the presence of 0.5 to 5% by weight of a peroxide, based in each case on the unmodified polymer, and contains units which, based in each case on the unmodified polymer, are derived from 30 to 90% by weight of vinylidene fluoride and from 70 to 10% by weight of at least one other vinyl monomer containing fluorine.

The core of the optical waveguide according to the invention comprises a polycarbonate or a polymer which contains units which are derived from styrene, from a substituted styrene, from an acrylate, from a methacrylate or from a fluoroacrylate. The polymers preferably used are those which have a higher glass transition point than PMMA, through which the long term service temperature of the optical waveguides can be further increased. These include polymers made from methyl α-fluoroacrylate (M-FA), made from α-fluoroacrylates, methacrylates and acrylates of halogenated phenols, of mono- and bicyclic alcohols, and of halogenated open chain, alicyclic and bicyclic alcohols and copolymers of these compounds with one another or with MMA, with hexafluoroisopropyl α-fluoroacrylate or with other α-fluoroacrylates and with methacrylates which contain aliphatic or fluorinated aliphatic alcohol components, and polycarbonates. Particularly preferred polymers are those which essentially comprise methyl α-fluoroacrylate, α-fluoroacrylates, methacrylates and acrylates of tri-, tetra- and pentafluorinated, -chlorinated and -brominated phenols, of 1,4,5,6,7,7-hexachlorobicyclo-(2.2.1)-hept-5-en-2-ol and of 1,4,5,6,7,7-hexabromobicyclo-(2.2.1)-hept-5-en-2-ol, of 1,4,5,6,7-pentachlorobicyclo-(2.2.1)-hept-5-en-2-ol and of 1,4,5,6-tetrachlorobicyclo-(2.2.1)-hept-5-en-2-ol, α-fluoroacrylates and methacrylates of cyclohexanol, of 3,3,5-trimethylcyclohexanol, of 2-methylcyclopentanol, of borneol, of isoborneol, and of norborneol, and polycarbonate. Particularly preferred polymers are those which essentially comprise pentachlorophenyl acrylate and pentachlorophenyl methacrylate (PCP-MA), norbornyl methacrylate and comprise 1,4,5,6,7,7-hexachlorobicyclo-(2.2.1)-hept-5-en-2-yl methacrylate and 1,4,5,6,7,7-hexachlorobicyclo-(2.2.1)-hept-5-en-2-yl acrylate, and polycarbonate.

These polymers are distinguished by having a refractive index of greater than 1.49 and glass transition temperatures of above 140° C. They are completely amorphous, as investigations of the fusion behaviour by means of DSC show, and transparent.

The sheath of the optical waveguide according to the invention comprises a polymer which contains units which are derived from vinylidene fluoride (VdF) and from one or more other unsaturated compounds containing fluorine, and which is modified by grafting of an alkenylalkoxysilane compound onto the vinylidene polymer in the presence of an organic peroxide free radical generator and addition of a silanol condensation catalyst and are crosslinked by treatment with water vapor or with an atmosphere containing water vapor.

As other unsaturated compounds containing fluorine, vinyl fluoride, trifluoroethylene, tetrafluoroethylene, pentafluoropropylene, hexafluoropropylene, chlorotrifluoroethylene or other alkenes containing fluorine, partly or fully fluorinated alkyl vinyl ethers such as perfluoropropyl vinyl ether or ω-H-perfluoroalkyl vinyl ethers or also carbonyl compounds containing fluorine, such as hexafluoroacetone, in each case alone or in combination with one or more of the compounds mentioned, can be copolymerized with vinylidene fluoride.

Of these compounds containing fluorine, trifluoroethylene, tetrafluoroethylene, hexafluoropropene, chlorotrifluoroethylene, perfluoropropyl vinyl ether and hexafluoroacetone are preferably copolymerized with vinylidene fluoride.

Particularly preferably, tetrafluoroethylene, hexafluoropropene and hexafluoroacetone are copolymerized with vinylidene fluoride.

The unmodified polymer contains units which are derived from 30 to 90, preferably 35 to 90% by weight of vinylidene fluoride and from 70 to 10, preferably 65 to 10% by weight of at least one other vinylmonomer containing fluorine. Typical compositions are the following:

Copolymers of VdF and TFE contain
  50 to 90, preferably 60 to 80% by weight of VdF and
  50 to 10, preferably 40 to 20% of TFE,
those of VdF and HFP contain
  3 to 18, preferably 3 to 10% by weight of HFP, and
  97 to 82, preferably 97 to 90% by weight of VdF,
those of VdF and HFA
  5 to 25, preferably 10 to 20% by weight of HFA, and
  35 to 75, preferably 90 to 80% by weight of VdF,
terpolymers of VdF, HFP and TFE contain
  30 to 50, preferably 35 to 45% by weight of VdF,
  25 to 55, preferably 35 to 45% by weight of TFE, and
  15 to 25, preferably 17 to 22% by weight of HFP,
based in each case on the total quantity of unmodified polymer.

These copolymers are modified by grafting with a trialkoxyvinylsilane, for example trimethoxyvinylsilane, triethoxyvinylsilane, tris(α-methoxyethoxy)vinylsilane or γ-methacryloxypropyltrimethoxysilane, preferably trimethoxyvinylsilane, in the presence of a suitable peroxide, for example dicumyl peroxide, by reacting 0.1 to 10% by weight of the silane and 0.5 to 5% by weight of the peroxide, based on the unmodified polymer, in a kneader with a melt of the polymer at a temperature of 150° to 200°, preferably of 180° to 200° C.

The modified polymer is freed in vacuo from volatile constituents and mixed with 0.01 to 2%, preferably 0.05 to 0.5% by weight, based on the unmodified polymer, of a silanol condensation catalyst, and the sheath of the optical waveguide is produced.

As soon as water vapor is present, the copolymers crosslink in the atmosphere. In comparison with the polymers for the core of the optical waveguide, the vinylidene fluoride copolymers for the sheath have a significantly lower refractive index. The polymers which are to be used according to the invention for the sheath are also transparent and almost completely amorphous, as revealed by measurements of the fusion behavior using DSC.

The optical waveguide according to the invention is produced by one of the following processes:

1. The optical waveguide is produced by simultaneous extrusion of the core material and of the sheathing material (coextrusion) using a two component die. The sheath is subsequently crosslinked by the ingress of water vapor.
2. The silane-modified fluoropolymer is processed to form a tube, subsequently crosslinked and filled with a prepolymer of a curable resin, and the resin is cured to form a transparent, bubble-free mass with a higher refractive index than that of the fluoropolymer.

The optical waveguide according to the invention with crosslinked, silane-modified polymer containing vinylidene fluoride as the sheath material and PMMA as the core material can be used in a temperature range up to 100° C. for 200 hours without losing any optical transparency.

The optical waveguide according to the invention exhibits an excellent optical transparency, as long as all solid particulate and soluble impurities are carefully eliminated and excluded during production of the polymer materials and of the optical waveguide. The optical transparency of a fiber of this type is generally expressed by the attenuation D, the reciprocal of optical transparency, in accordance with the formula $$D = 10 \times \log (I/I_0)/1,$$

in units of dB/km. In the formula, I denotes the intensity of the light at the end of the optical waveguide, $I_0$ the intensity at the start of the optical waveguide, and 1 the length of the optical waveguide in km.

An optical waveguide which has been produced from the given materials in accordance with the given process and whose sheath material has been crosslinked using the given process, simultaneously exhibits low light attenuation, a high long term service temperature and good mechanical properties.

The invention is explained in more detail using the following examples, in which the attenuation of an optical waveguide is determined in the following way:

Using a suitable light source, light was introduced into one end of a 10 to 30 m long optical fiber, while at the other end the intensity of the emerging light was measured. The optical fiber was subsequently shortened in each case by an exactly determined length of about 1 meter and the emerging light intensity was measured again. The attenuation can be determined from the gradient using a logarithmic plot of the measured light intensities against the corresponding length of optical waveguide.

For the duration of the measurement of the temperature dependence of attenuation, the connections between light source and light detector and optical waveguide were not altered, but merely an exactly determined part of the optical waveguide was maintained at the measuring temperature in an air bath in a climatic test cabinet. The variation of attenuation in the temperature conditioned part of the optical waveguide can be calculated from the weakening in the light intensity at the outlet of the optical waveguide and from the length of the temperature conditioned section of fiber.

For measuring flexibility, the connections between light source and light detector and the optical waveguide were not altered after the first measurement of the emerging light intensity. A part of the optical fiber in the middle of the measured section was wound three times around a cylindrical rod and unwound again from the rod, and subsequently the intensity of the emerging light was measured. If the intensity of the light had not reduced or not significantly reduced, the procedure was repeated with a rod of smaller diameter. The smallest bending radius admissible without impairment of the quality of the optical waveguide is a measure of the flexibility of the optical waveguide.

Example 1

Initially, a copolymer made from TFE, HFP and VdF was produced in a known manner in a suspension process. The aqueous liquor contained perfluorooctanoic acid as emulsifier and potassium hydrogensulphate as buffer. Ammonium persulphate was the initiator. 40% by weight of TFE, 20% by weight of HFP and 40% by weight of VdF were polymerized at a temperature of 70° C. and a pressure of 9 bar. Diethyl malonate was the regulator.

The product was soluble in methyl ethyl ketone and other solvents. A 1% strength solution had a reduced specific viscosity at 25° C. of 87 cm$^3$/g. A weight average molecular weight of 177,000 was determined using gel permeation chromatography (in tetrahydrofuran as solvent, measured using a calibration curve from standard preparations of polystyrene). The composition of the polymer was determined by 19-F-NMR spectroscopy as 40 parts by weight of TFE, 20 parts of HFP and 40 parts of VdF. The refractive index of the copolymer was $n_D^{25} = 1.36$.

Only very small proportions of crystallinity were detectable by DSC.

Example 2 100 parts by weight of methyl methacrylate were freed from impurities by distillation and filtration through a fine-pore membrane filter, mixed with 0.1 part of dicumyl peroxide and 0.3 part of dodecyl mercaptan and continuously added to a stirred reactor heated to 100° to 130° C. In the reactor, a syrup-like viscous mass, comprising monomer and polymer, formed from the monomers and was continuously transferred from the reactor into a twin screw extruder. In the twin screw extruder the proportion of polymer increased due to continued polymerization at 120° to 170° C. to 80 to 100% conversion. Excess free monomer was removed in vacuo in the degassing zone of the extruder. The resulting polymer was free from volatile constituents and had an average degree of polymerization (weight average) $P_w = 1100$.

In the same manner as described in Example 1, a copolymer of VdF, TFE and HFP was produced and 100 parts by weight of this copolymer were reacted in accordance with Example 9 of German Patent No. 3,327,596 with 2 parts by weight of trimethoxysilane and 0.2 part by weight of dicumyl peroxide at 190° C. in a twin screw kneader, degassed and kneaded with 0.033 part by weight of dibutyltin laurate.

In a two component die, PMMA was processed to form the core, and the modified vinylidene fluoride copolymer to form the sheath of an optical waveguide. The settings of the spinning equipment were adjusted in such a way that a fiber 1 mm in diameter having a sheath layer 10 μm thick resulted. The optical waveguide was exposed to a humid atmosphere for 10 hours.

After this treatment it had an attenuation at 25° C. of 420 dB/km at 650 nm. The attenuation increased to 460 dB/km at 70° C., to 520 dB/km at 120° C. and only increased more rapidly at still higher temperatures. The optical waveguide could be wound around a circular rod 10 mm in diameter without significant reduction in transparency.

Example 3

In the same manner as described in Example 1, a copolymer made from 60 parts by weight of VdF and 40 parts by weight of TFE was produced and, as described in Example 2, was mixed with 2 parts by weight of trimethoxysilane, 0.2 part by weight of dicumyl peroxide and 0.08 part by weight of dibutyltin laurate.

In a two component die, PMMA was processed to the form the core, and the modified vinylidene fluoride copolymer to form the sheath of an optical waveguide. The settings of the spinning equipment were adjusted in such a way that a fiber 1 mm in diameter having a sheath layer 10 μm thick resulted. The optical waveguide was exposed to a humid atmosphere for 10 hours. After this treatment it had an attenuation at 25° C. of 480 dB/km at 650 nm. At 70° C., the attenuation increased to 530 dB/km, at 120° C. to 580 dB/km, and only increased more rapidly at still higher temperatures. The optical waveguide could be wound around a circular rod 25 mm in diameter without any significant reduction in the transparency.

Example 4

In the same manner as described in Example 1, a copolymer made from 93 parts by weight of VdF and 7 parts by weight of HFP was produced, reacted with 2 parts by weight of trimethoxyvinylsilane and 0.2 part by weight of dicumyl peroxide, melted in a twin screw extruder, degassed and intimately mixed with 0.08 part by weight of dibutyltin laurate.

In a two component die, PMMA was processed to form the core, and the modified vinylidene fluoride copolymer to form the sheath of an optical waveguide. The settings of the spinning equipment were adjusted in such a way that a fiber 1 mm in diameter having a sheath layer 10 μm thick resulted. The optical waveguide was exposed to a humid atmosphere for 10 hours. After this treatment it had an attenuation at 25° C. of 430 dB/km at 650 nm. The attenuation increased at 70° C. to 450 dB/km, at 120° C. to 500 dB/km and only increased more rapidly at still higher temperatures. The optical waveguide could be wound around a rod 25 mm in diameter without any significant reduction in transparency.

Example 5

In the same manner as described in British Patent 2,161,954, a copolymer made from 82 parts by weight of VdF and 18 parts by weight of hexafluoroacetone was produced and, in the same manner as described in Example 2, reacted with 2 parts by weight of trimethoxyvinylsilane and 0.2 part by weight of dicumyl peroxide, melted in a twin screw extruder, degassed and intimately mixed with 0.08 part by weight of dibutyltin laurate.

In a two component die, PMMA was processed to form the core, and the modified vinylidene fluoride copolymer to form the sheath of an optical waveguide. The settings of the spinning equipment were adjusted in such a way that a fiber 1 mm in diameter having a sheath layer 10 μm thick resulted. The optical waveguide was exposed to a humid atmosphere for 10 hours. After this treatment it had an attenuation at 25° C. of 550 dB/km at 650 nm. At 70° C., the attenuation increased to 670 dB/km, at 120° C. to 710 dB/km and only increased more rapidly at still higher temperatures. The optical waveguide could be wound around a rod 25 mm in diameter without any significant reduction in transparency.

Example 6

In the same manner as described in Example 2, an optical waveguide was produced, but instead of the given mixture of MMA, dicumyl peroxide and dodecyl mercaptan, a mixture of 30 parts by weight of MMA, 62 parts by weight of norbornyl methacrylate and 1 part by weight of methyl acrylate as well as 0.1 part by weight of tert.-butyl peroxide and 0.3 part by weight of dodecyl mercaptan was added to the reactor at a polymerization temperature of 130° C. The polymer which had been polymerized in an extruder with a degassing zone and had been freed from volatile constituents had a degree of polymerization $P_w$ of 850. The glass transition temperature was determined as 151° C. using the DSC method.

The optical waveguide had a diameter of 0.5 mm, and the sheath a layer thickness of 10 μm. It was treated with 30 Mrad of γ-radiation from a Co(60) source.

After storage for 1 day in air the optical waveguide exhibited a light attenuation of 780 dB/km at 25° C., 820 dB/km at 70° C. and 650 nm and 910 dB/km at 120° C. Admittedly, the light attenuation increased to over 2000 dB/km on further heating to 150° C., but after cooling the original values were almost recovered (750 dB.km at 25° C.).

The optical waveguide could be wound around a rod 25 mm in diameter without any loss of optical transparency.

Comparative example A

An optical waveguide which had been produced in accordance with the data in Example 2 from PMMA as the core and from an unmodified VdF-TFE-HFP terpolymer as the sheath, had a light attenuation of 250 dB/km at 25° C., and 280 dB/km, at 70° C. The optical waveguide was heated to 110° C. for 15 minutes in an air bath, and subsequently cooled again to 25° C. The attenuation was subsequently 3100 dB/km.

We claim:

1. An optical waveguide having a core/sheath structure whose core comprises a polymer with a refractive index n(C) and whose sheath comprises a polymer with a refractive index n(S), where n(C)/n(S)>1.01, wherein the core comprises a polycarbonate, or comprises a polymer which contains units selected from the group consisting of units which are derived from styrene, from a substituted styrene, from an acrylate, from a methacrylate or from a fluoroacrylate, and the sheath comprises a polymer which has been modified and crosslinked with 0.1 to 10% by weight, based on the unmodified polymer, of a trisalkoxyvinylsilane, and contains units which, based in each case on the unmodified polymer, are derived from 30 to 90% by weight of vinylidene fluoride and from 70 to 10% by weight of at least one other vinyl monomer containing fluorine.

2. An optical waveguide as claimed in claim 1, wherein the core comprises a polymer which contains units selected from the group consisting of units derived from α-fluoroacrylates, acrylates and methacrylates.

3. An optical waveguide as claimed in claim 1, wherein the core is a polycarbonate.

4. An optical waveguide as claimed in claim 1, wherein the sheath comprises a polymer which has been modified and crosslinked with 0.1 to 10% by weight, based on the unmodified polymer, of a trisalkoxyvinylsilane, and contains units which, based in each case on the unmodified polymer, are derived from 30 to 90% by weight of vinylidene fluoride and from 70 to 10% by weight of at least one other vinyl monomer containing fluorine, from the group tetrafluoroethylene, hexafluoropropylene and hexafluoroacetone.

5. The use of the optical waveguide as claimed in claim 1 for transmitting light signals.

6. A process for producing an optical waveguide having a core/sheath structure whose core comprises a polymer with a refractive index n(C) and whose sheath comprises a polymer with a refractive index n(S), wherein n(C)/n(S)>1.01, comprising the steps of:

extruding the core wherein the core is extruded from a polycarbonate, or from a polymer which contains units which are selected from the group consisting of units derived from styrene, from a substituted styrene, from an acrylate, from a methacrylate or from a fluoroacrylate;

encasing the core with a sheath of a polymer which has been modified with 0.1 to 10% by weight, based on the unmodified polymer, of a trisalkoxyvinylsilane and has been crosslinked in the presence of 0.05 to 0.05% by weight, based on the unmodified polymer, of a transsilylation catalyst by the action of moisture, and contains units which, based in each case on the unmodified polymer, are derived from 30 to 90% by weight of vinylidene fluoride and from 70 to 10% by weight of at least one other vinyl monomer containing fluorine.

7. The process as claimed in claim 6, wherein the core and the sheath are produced simultaneously by coextrusion.

8. A process for producing an optical waveguide having a core/sheath structure whose core comprises a polymer with a refractive index n(C) and whose sheath comprises a polymer with a refractive index n(S), where n(C)/n(S) > 1.01, modifying the sheath, made from a polymer with 0.1 to 10% by weight, based on the unmodified polymer, of a trisalkoxyvinylsilane and contains 0.05 to 0.5% by weight, based on the unmodified polymer, of a transsilylation catalyst, and contains units, based in each case on the unmodified polymer, which are derived from 30 to 90% by weight of vinylidene fluoride and from 70 to 10% by weight of at least one other vinyl monomer containing fluorine, is extruded as a tube and is cross-linked by the action of moisture; and subsequently filling this tube to form the core with a low viscosity transparent prepolymer which contains units selected from the group consisting of units which are derived from styrene, from a substituted styrene, from an acrylate, from a methacrylate, from a fluoroacrylate or from a polymerizable carbonate; and polymerizing the filling.

* * * * *